US012682412B2

(12) United States Patent
Hoffmann et al.

(10) Patent No.: US 12,682,412 B2
(45) Date of Patent: Jul. 14, 2026

(54) BOAT RAMP OCCUPANCY INDICATOR SYSTEM AND METHOD

(71) Applicants: ZF Friedrichshafen AG, Friedrichshafen (DE); ZF Marine Propulsion Systems Miramar, LLC, Miramar, FL (US)

(72) Inventors: Lars Hoffmann, Deerfield Beach, FL (US); Daniel Biefeld, Friedrichshafen (DE)

(73) Assignees: ZF Friedrichshafen AG, Friedrichshafen (DE); ZF Marine Propulsion Systems Miramar, LLC, Miramar, FL (US)

( * ) Notice: Subject to any disclaimer, the term of this patent is extended or adjusted under 35 U.S.C. 154(b) by 87 days.

(21) Appl. No.: 18/441,098

(22) Filed: Feb. 14, 2024

(65) Prior Publication Data

US 2024/0273663 A1 Aug. 15, 2024

Related U.S. Application Data

(60) Provisional application No. 63/485,129, filed on Feb. 15, 2023.

(51) Int. Cl.
*G06Q 50/40* (2024.01)
*B60W 40/04* (2006.01)
*G06Q 10/04* (2023.01)

(52) U.S. Cl.
CPC ............. *G06Q 50/40* (2024.01); *B60W 40/04* (2013.01); *G06Q 10/04* (2013.01)

(58) Field of Classification Search
CPC ........ G06Q 50/40; G06Q 10/04; B60W 40/04
(Continued)

(56) References Cited

U.S. PATENT DOCUMENTS 3,447,815 A 6/1969 West
3,720,967 A 3/1973 Rice
(Continued)

FOREIGN PATENT DOCUMENTS

DE 20 2019 218 929 A1 6/2021
DE 10 2020 201 785 A1 8/2021

OTHER PUBLICATIONS

J. Higinbotham et al., "Update on the Development and Testing of a New Long Duration Solar Powered Autonomous Surface Vehicle", IEEE, 2008, pp. 1-10.
(Continued)

*Primary Examiner* — Krishnan Ramesh
(74) *Attorney, Agent, or Firm* — Secant IP, PLLC

(57) ABSTRACT

A boat ramp occupancy indicator system having a server entity with database, a first input for receiving current weather and tidal information, a second input for receiving traffic information, and a plurality of smart phones having an end-user application operating therein. The system communicating with each one of the end-user applications operating on a smart phone. When a smart phone, operating the end-user application, is located at or near a selected boat ramp, the system sends a push notification to such user inquiring if the user is located at the boat ramp. The system determining, regardless of whether or not the user responds to the sent push notification, how busy the selected boat ramp is. The system, based upon how busy the selected boat ramp is determined to be, sending out informative notifications to other users who have designated the select boat ramp as a favorite boat ramp.

16 Claims, 7 Drawing Sheets

(58) Field of Classification Search
USPC ........................................................ 701/118
See application file for complete search history.

(56) References Cited

U.S. PATENT DOCUMENTS

| | | | |
|---|---|---|---|
| 4,011,958 A | 3/1977 | Carrick | |
| 4,114,920 A | 9/1978 | Boettcher | |
| 4,429,893 A | 2/1984 | Palamara | |
| 10,011,211 B1 | 7/2018 | Gutierrez et al. | |
| 11,816,746 B2 * | 11/2023 | Mimassi | G06F 21/32 |
| 2009/0302572 A1 | 12/2009 | Bryant, II | |
| 2016/0264220 A1 | 9/2016 | Laceky et al. | |
| 2016/0368578 A1 | 12/2016 | Walke | |
| 2018/0050772 A1 | 2/2018 | Koyano et al. | |
| 2022/0092709 A1 * | 3/2022 | Mimassi | G06F 21/32 |
| 2023/0368675 A1 * | 11/2023 | Gardner | B60W 60/0015 |

OTHER PUBLICATIONS

J. Paulos et al., "Automated Self-Assembly of Large Maritime Structures by a Team of Robotic Boats", IEEE Transactions on Automation Science and Engineering, vol. 12, No. 3, Jul. 2015, pp. 958-968.
"Popular times, wait times, and visit duration", https://support.google.com/business/answer/6263531?sjid=17069684938703667436-NA, at least as early as Jan. 20, 2023.
wiki.ros.org/aruco_mapping; at least as early as Oct. 10, 2015.

* cited by examiner

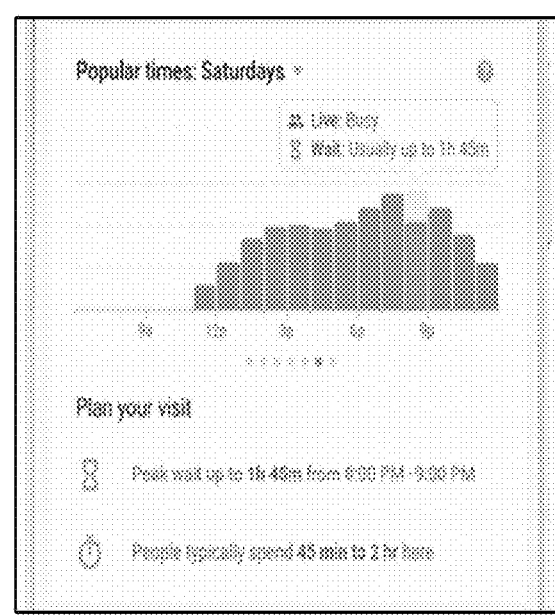
PRIOR ART
FIG. 1
FIG. 2A　　　　　　FIG. 2B　　　　　　FIG. 2C

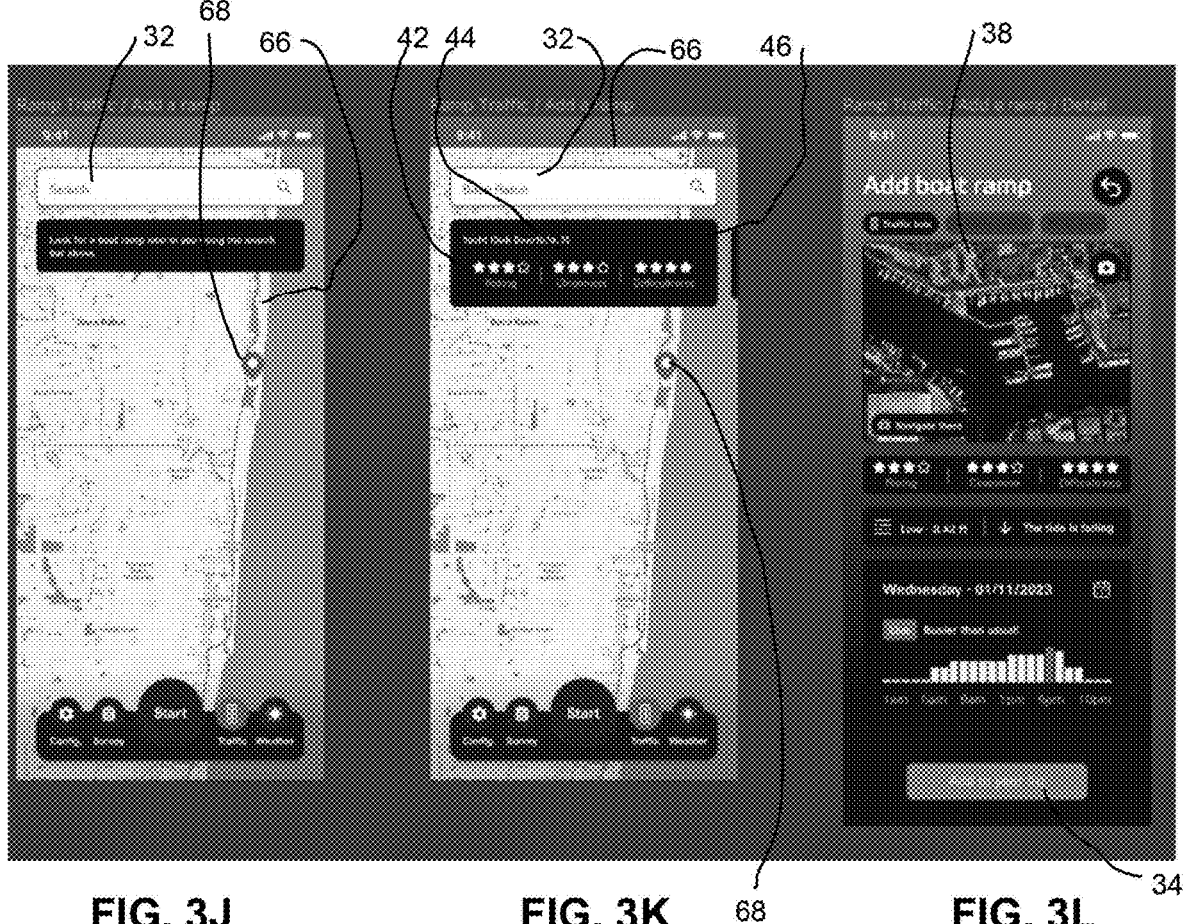
FIG. 3J          FIG. 3K          FIG. 3L

BOAT RAMP OCCUPANCY INDICATOR SYSTEM AND METHOD

FIELD OF THE INVENTION

This present invention relates to a boat ramp occupancy indicator system and method which are designed to indicate a current level of usage of a boat loading ramp, as well as the adjacent parking lot, and thereby assist a user with determining the best time to access a particular boat loading ramp so as to minimize the associated time, effort and/or stress involved in either unloading or loading a boat at the desired boat ramp. The boat ramp occupancy indicator is designed to provide the boat owner or captain with a combination of statistical and a live traffic data-based indication of when the best time is for the boat owner or captain to arrive at his/her favorite boat ramp in order to launch his/her boat onto the water for a boating activity. The boat ramp occupancy indicator is also designed to assist the boat owner or captain with determining the best time to arrive at the boat ramp, after completion of the boating activity, in order to remove his/her boat from the water.

As an additional feature, the boat ramp occupancy indicator also provides specific weather conditions for each desired boat ramp, specific tidal forecasts for each desired boat ramp as well as community-based ranking features relating to the location of the boat ramp as well as details relating to cleanliness and ease of use of the boat ramp. The boat ramp occupancy indicator may, for example, serve as a software feature "addon" to a conventional "smart phone" boat load application having a ramp assist unloading/loading feature which assists a pleasure craft boat owner or captain with maneuvering his/her boat back from the water, after a boating activity, and loading the boat upon the boat trailer, see U.S. patent application Ser. No. 17/160,652 filed Jan. 28, 2021 which subject matter is incorporated herein by reference in its entirety, or the boat ramp occupancy indicator may possibly be a stand-alone solution and/or licensed to a third party provider.

BACKGROUND OF THE INVENTION

As is well known, boating is a huge hobby and past time since many people worldwide own boats which are loaded on trailers and can be towed to different boat ramps and launched on a desired body of water, such as a lake, pond, river, sea, ocean, etc., for a desired boating activity. As a result of this, any particular boat ramp can be either relatively "empty" (e.g., virtually no waiting line and plenty of available parking) or "extremely busy" (e.g., relatively long waiting lines and very limited or no available parking), or anywhere in between those extremes. In addition, the weather, the time of day (e.g., morning, afternoon or evening), the specific day (i.e., whether it is a weekday, a weekend or a holiday), and the time of year (i.e., summer, spring, fall or winter), can also have a significant impact on how busy any particular boat ramp may be at any particular time.

As is also well known in the art, a busy boat ramp can lead not only to long waiting times for the boat owner or captain, but also tends to lead to distractions as well as social pressure since the other boat owners, currently waiting in line to launch or retrieve a boat, typically become spectators that watch and evaluate how well the particular person(s), currently unloading or loading his/her boat, performs the task at hand. It is a common practice for boaters of all skill levels, from newbies to advanced boaters, to drive by their favorite boat ramp initially and scout whether or not the boat ramp is crowded. In the event that the boat ramp is not particularly crowded, then the boat owner or captain typically drives to the current location of his/her boat, attach the boat and trailer to the towing vehicle and then return to his/her favorite boat ramp in order to launch the boat for a boating activity. In many instances, however, by the time that the boat owner or captain is able to return back to the previously scouted boat ramp, with the boat and trailer in tow, the situation at his/her favorite boat ramp may have significantly changed to the detriment of the boat owner or captain.

Navigation and mapping software, from Google or other digital map providers for example, are currently available. Such software typically utilizes the location data of its users in order to estimate the occupancy of, for example, a main street or a public place at any particular point in time. From this information, the software provider is then able to provide users of an estimated occupancy, for example, of the main street of a particular city or a public place of interest, as generally shown in FIG. 1. This information is typically historical data and may not accurately reflect the current occupancy level, for example, of the main street or the public place at any particular date and/or time. Accordingly, while this information may be somewhat helpful to users, it tends to be of limited value to boat owners or captains due to fact that this information is purely historical and does not include any "real time" occupancy data.

SUMMARY OF THE INVENTION

Wherefore, it is an object of the present invention to overcome the above mentioned shortcomings and drawbacks associated with the prior art loading and unloading techniques, processes, systems and methods.

A further object of the disclosure is to provide a boat ramp occupancy indicator system which is able to accurately estimate and determine, in real time, the occupancy level of any particular boat ramp so as to provide users and/or potential users, of the boat ramp, with accurate and reliable information concerning the current occupancy level of any boat ramp of interest.

Yet another object of the disclosure is to send out "push notifications" to the various users of the boat ramp occupancy indicator system, when any of such users are physically located at or near one of the boat ramps included as part of the boat ramp occupancy indicator system, so that such user may send return information, in real time, relating to the current occupancy level of the boat ramp. The boat ramp occupancy indicator system can then utilize and process such inputted information and data, along with information and data previously and continuously collected by the boat ramp occupancy indicator system and, thereafter, send out occupancy level notices, as appropriate, to selected users of the boat ramp occupancy indicator system so that such users can then utilize such notifications to determine when and where to launch a boat for a desired boating activity. The boat ramp occupancy indicator system is designed to collect, over a prolonged period of time, e.g., many months and years, reply information from the push notifications and compile and process all of this information in order to provide fairly current information, to the various users of the boat ramp occupancy indicator system, relating to the current occupancy level of any desired boat ramp of interest.

A still further object of the disclosure is to gather additional information from other related applications, e.g., as disclosed in U.S. patent application Ser. No. 17/160,652 filed Jan. 28, 2021. The information collected from such related application(s), e.g., one or more image(s), can also supply useful data concerning how busy a particular boat ramp is when a user, of that related application, is either unloading or loading his/her boat from or onto a trailer at a boat ramp of interest. The one or more images of the boat ramp, generated while using that application during the trailering process, can be inputted into the boat ramp occupancy indicator system and associated method, according to the disclosure, and evaluated and processed by the algorithm operating on the server entity with database to determine how busy that boat ramp currently is.

The present disclosure constantly and continuously collects information and data, concerning the occupancy level of each boat ramp of interest, over a prolonged period of time, e.g., many weeks, months or years, in order to be able to predict more accurately the best time, or window of time, concerning when to unload or load a boat at each boat ramp of interest. The information and data collected over time is also continuously combined and processed with new information and data, collected each day, which leads to more accurate determinations of when is the best window of time for unloading or loading a boat at each boat ramp of interest.

BRIEF DESCRIPTION OF THE DRAWINGS

The accompanying drawings, which are incorporated in and constitute a part of the specification, illustrate various embodiments of the disclosure and together with the general description of the disclosure given above and the detailed description of the drawings given below, serve to explain the principles of the disclosure. The disclosure of the invention will now be described, by way of example, with reference to the accompanying drawings in which:

FIG. 1 is a diagrammatic view showing the results of a prior art system which merely estimates the occupancy of a particular location;

FIG. 2A is a diagrammatic view of a screen shot of the end-user application, operating on a smart phone, showing a "push notification" being sent to a user of the boat ramp occupancy indicator, based upon that user's location being indicated as close to or at a particular boat ramp, e.g., the FTL Club and Trailer ramp, which inquires whether the user is at that boat ramp;

FIG. 2B is a diagrammatic view of a screen shot of the end-user application, operating on a smart phone, following an affirmative reply to the push notification by the user being located at a particular boat ramp, e.g., the FTL Club and Trailer ramp, which seeks further user input concerning how busy that boat ramp currently is;

FIG. 2C is a diagrammatic view of a screen shot of the end-user application, operating on a smart phone, showing two "push notifications" being sent by the boat ramp occupancy indicator system to a user, of the boat ramp occupancy indicator end-user application, which provides such user with periodic updates concerning how busy his/her favorite boat ramp(s) is/are at the present time;

FIG. 3J is a diagrammatic view of a screen shot of the end-user application, operating on a smart phone, following selection by the user of a searched area for boat ramps in the system, with each boat ramp being designated with a dropped pin;

FIG. 3K is a diagrammatic view of a screen shot of the end-user application, operating on a smart phone, following selection by the user of one of the boat ramps, designated with a dropped pin, which displays the various ratings of that boat ramp;

FIG. 3L is a diagrammatic view of a screen shot of the end-user application, operating on a smart phone, following selection of the boat ramp, designated with a dropped pin, which now displays the current occupancy level concerning that boat ramp and provides the user with an "Add to your list" button which permits the user to add that boat ramp as a favorite;

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

Figures 3A, 3B, 3C, 3D:
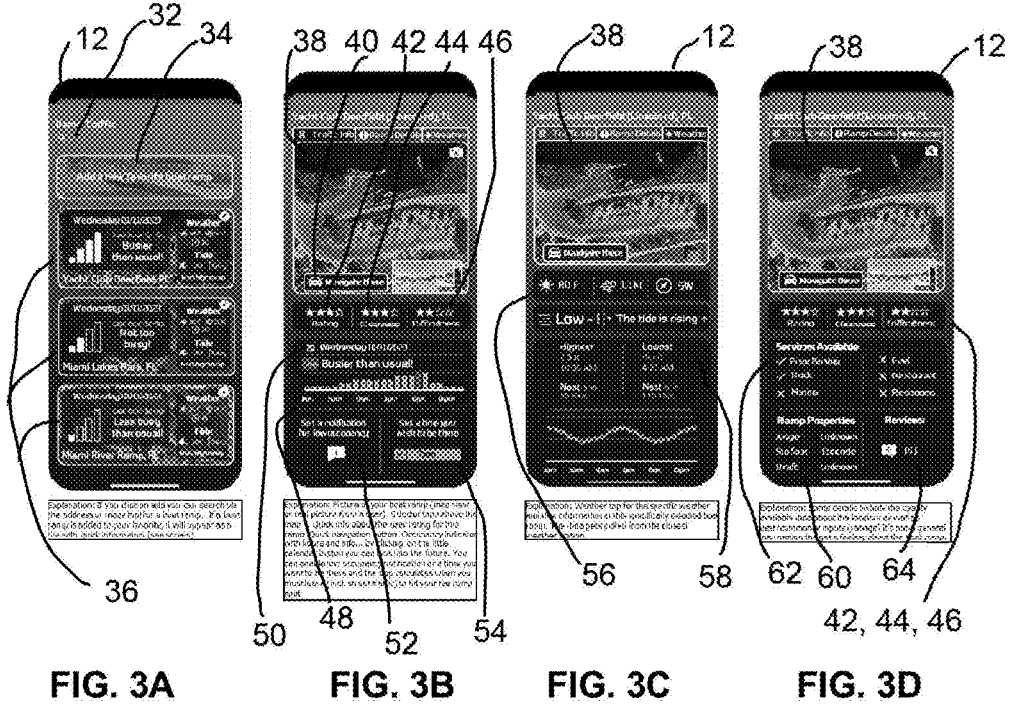
FIG. 3A is a diagrammatic view of a screen shot of the end-user application, operating on a smart phone, showing relevant information concerning the current occupancy level of three of the favorite boat ramps of that user as well as providing the user with other relevant information, such as current weather and tidal information of favorite boat ramps.
FIG. 3B is a diagrammatic view of a screen shot of the end-user application, operating on a smart phone, following selection by the user, of one of his/her favorite boat ramps displaying additional relevant information for that selected boat ramp, e.g., Yacht Club Deerfield (Lincoln Rd), FL.
FIG. 3C is a diagrammatic view of a screen shot of another page of the end-user application, operating on a smart phone, following scrolling by the user, showing relevant information relating to the weather and the tides for that selected favorite boat ramp, e.g., Yacht Club Deerfield (Lincoln Rd), FL.
FIG. 3D is a diagrammatic view of a screen shot of yet another page of the end-user application, operating on a smart phone, following scrolling by the user, displaying relevant information relating to the ramp properties and the available services at that selected boat ramp, e.g., Yacht Club Deerfield (Lincoln Rd), FL.
Figures 3E, 3F:
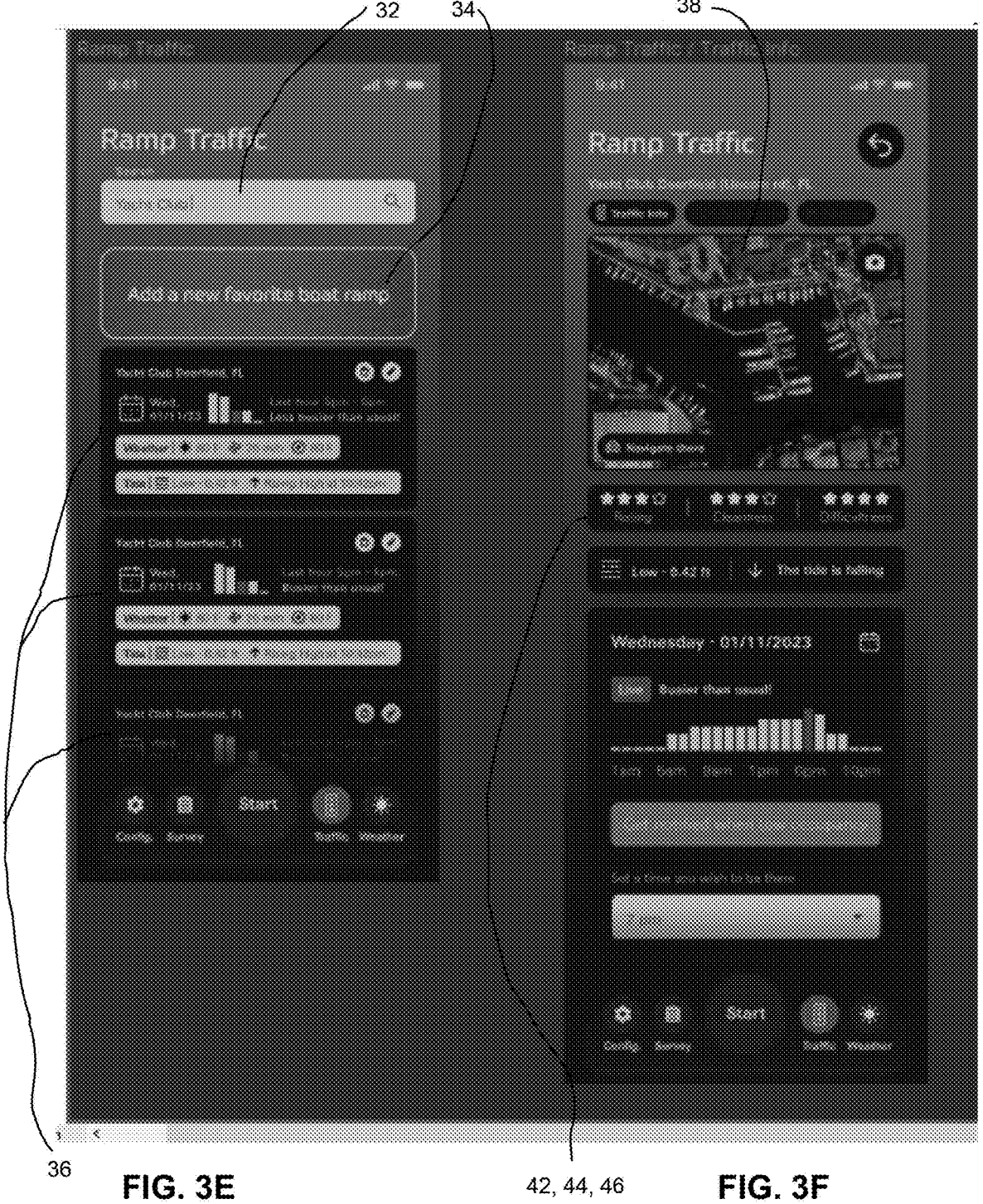
FIG. 3E is a diagrammatic view of a screen shot of the end-user application, operating on a smart phone, showing relevant information concerning the current occupancy level of three of the favorite boat ramps of that user as well as providing the user with other relevant information, such as current weather and tidal information.
FIG. 3F is a diagrammatic view of a screen shot of the end-user application, operating on a smart phone, following selection by the user, of one of his/her favorite boat ramps displaying additional relevant information for that selected boat ramp, e.g., Yacht Club Deerfield (Lincoln Rd), FL.
Figures 3G, 3H, 3I:
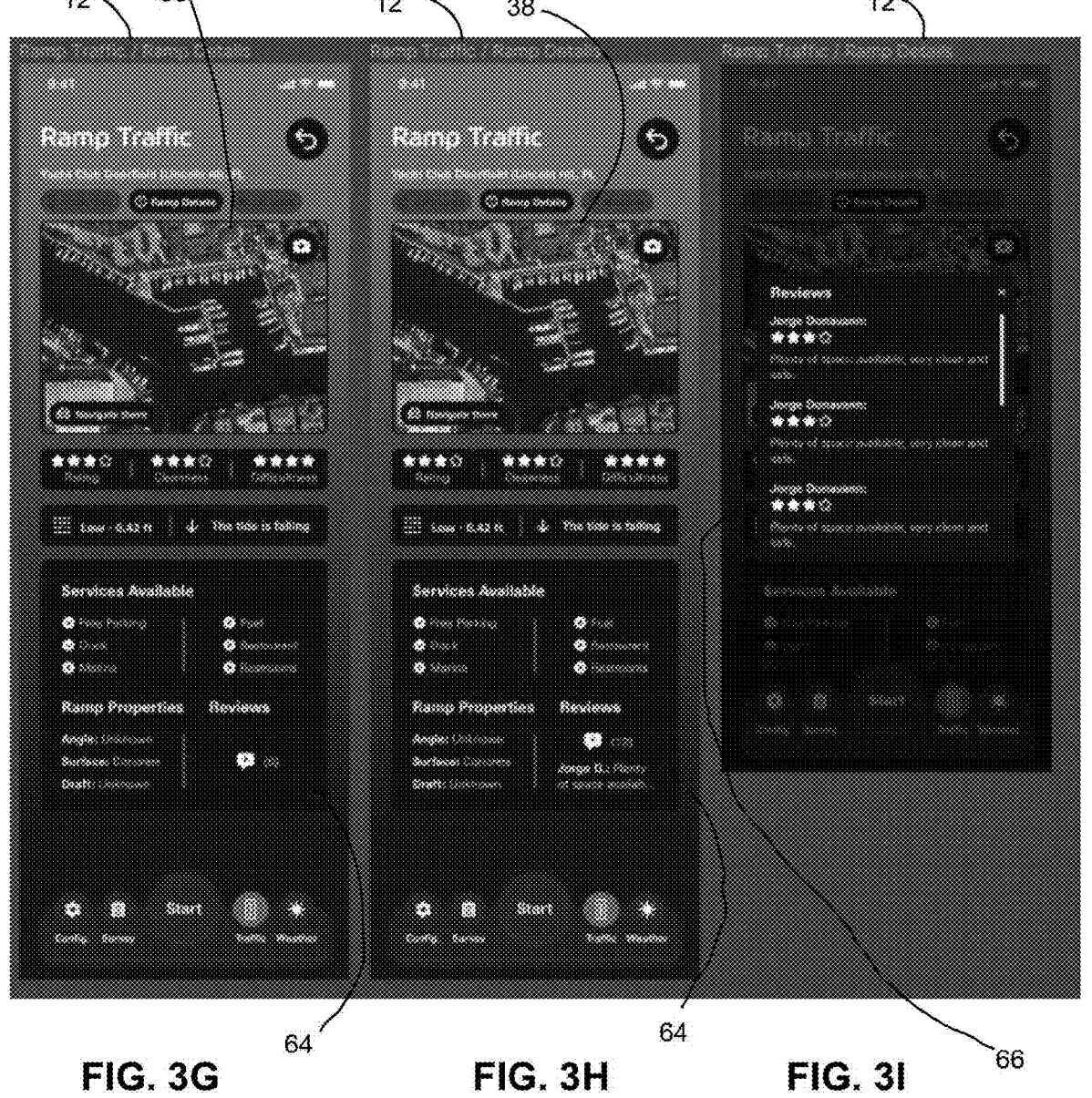
FIG. 3G is a diagrammatic view of a screen shot of the end-user application, operating on a smart phone, showing a Yacht Club Deerfield (Lincoln Rd), FL boat ramp with zero reviews posted concerning that boat ramp.
FIG. 3H is a diagrammatic view of a screen shot of the end-user application, operating on a smart phone, showing a Yacht Club Deerfield (Lincoln Rd), FL boat ramp having 12 reviews posted concerning that boat ramp.
FIG. 3I is a diagrammatic view of a screen shot of the end-user application, operating on a smart phone, showing the actual posts concerning the Yacht Club Deerfield (Lincoln Rd), FL boat ramp after the user selected the "Reviews" button.
Figure 4:
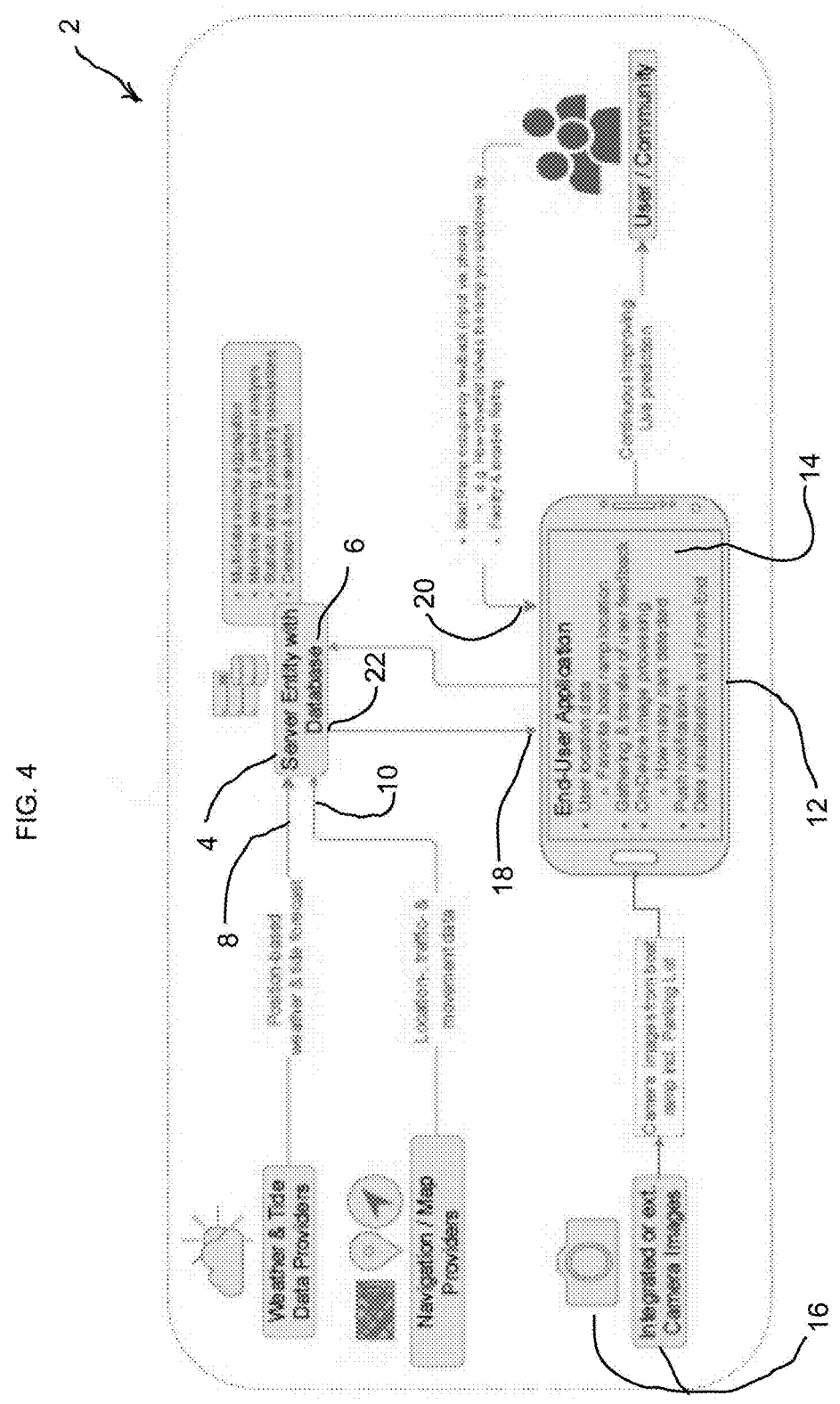
FIG. 4 is a diagrammatic view showing the general components, inputs and outputs of the boat ramp occupancy indicator system and method according to the disclosure.

With reference now to FIGS. 2A-4, a detail description concerning the boat ramp occupancy indicator system and associated method 2 will now be provided. As generally shown in FIG. 4, the boat ramp occupancy indicator system and associated method 2, according to all embodiments of the disclosure, incorporates a server entity with database 4 which includes a specialized CPU 6 (central processing unit not shown in detail) which is designed to receive at least a first (weather) input 8 for receiving information relating to current weather and tidal information from one or more local service providers relating to each one of the available boat ramps of the system, and at least a second (navigation/map) input 10 for receiving information relating to the current state of the traffic situation (location, traffic and movement data) proximate to and in the vicinity of each boat ramp in the system as well as movement of the traffic throughout the region, county or state.

The server entity with database 4 is: 1) a multi-data source which is designed for the aggregation and compilation of information and data, 2) having machine learning and pattern analysis functionality, 3) designed to provide statistical data and probability calculations, and 4) which generates decisions and risk calculations, as discussed below in further detail. The boat ramp occupancy indicator system and associated method 2 is designed to communicate with a plurality of users which have the boat ramp occupancy indicator software (the boat ramp occupancy indicator "end-user application" 14) operating on his/her respective smart phone 12. For ease of understanding, only a single smart phone 12, having the end-user application 14 operating thereon, is diagrammatically shown in FIG. 4.

As is conventional, in order to become a user of the boat ramp occupancy indicator system and associated method 2, that user must first access an "app store" or the server entity with the database 4 of the boat ramp occupancy indicator system via his/her smart phone and then download end-user application. Thereafter, the user can then activate the end-user application 14 and commence using the boat ramp occupancy indicator system and associated method 2 and become a "user" thereof. It is to be noted that one of the automatic default settings of the end-user application 14, is that all users of the end-user application 14 permit the boat end-user application 14 to access the current location of the smart phone so that important "push notifications," as discussed below, can be sent to as well as be received by and from the smart phone 12, and the importance of which will become apparent from the following discussion.

As is conventional in the art, most conventional smart phones are equipped with an internal or integrated camera 16 for inputting one or more images into the smart phone 12. Alternatively, it is to be appreciated that an external camera (also designated as element 16) may be connected or coupled as an input for inputting one or more images into the smart phone 12 or the boat ramp occupancy indicator system and associated method 2. Either the boat ramp occupancy indicator system and associated method 2 and/or end-user application 14 is/are provided with a push notification feature for sending various "push" notifications to users of the end-user application 14 in order to seek either input from such users concerning the current level of occupancy of a particular boat ramp or to send one or more informational push notifications 30 to such users informing such users of the current level of occupancy of one or more of their favorite boat ramp(s). The end-user application 14 has at least one (occupancy/rating feedback) input 20, 18 for receiving user feedback concerning the current occupancy level of various boat ramps as well as receiving one or more ratings of user concerning such users recent experience with the particular boat ramp being utilized by the user. Each end-user application 14 communicates with the boat ramp occupancy indicator system and associated method 2 for sending a receiving various push notifications 24, 26, 30 as well as sending and receiving occupancy/rating feedback 18, 20 from various users and the boat ramp occupancy indicator system and associated method 2.

Based upon the received input or data from various push notifications 24, 26, 30 as well as other received inputs in combination with the stored boat ramp data, the CPU 6 then employs an algorithm to generate and provide output notices for periodically sending to various users concerning the best time for such user to access a favorite boat ramp for unloading or loading a boat from or onto a trailer. Further details of the boat ramp occupancy indicator system and associated method 2 are provided below.

As noted above, the boat ramp occupancy indicator system and associated method 2 is provided with the first (push) notification output 22 for sending various "push" notifications 24, 26, 30 to a selected smart phone(s) 12 operating the end-user application 14—see FIGS. 2A-2C—provided that the user has elected to enable the end-user application 14 to access the location data of the smart phone 12. Assuming that the smart phone 12 is currently located at or near a boat ramp and the end-user application 14 is able to access the location data of the smart phone 12, the boat ramp occupancy indicator system and associated method 2 is then able to send out an initial "push" notification 24, as generally shown in FIG. 2A, to such user of the end-user application 14 that will typically inquire if the user is located at a particular boat ramp, e.g., "Are you at the "FTL Club Boat & Trailer" ramp?" In the event that the user sends an affirmative reply to that initial "push" notification 24, then the boat ramp occupancy indicator system and associated method 2 can then send out a follow-up notification or inquiry 26 to that user, e.g., "How busy is it?", as generally shown in FIG. 2B. The user can then respond to that follow-up notification by sending a number, for example, of between 1 and 5, with "1" designating not busy, e.g., "I'm alone," while "5" designating very busy. Upon receiving a reply, the boat ramp occupancy indicator system and associated method 2 may possibly send out a subsequent inquiry, e.g., "How long have you been at the boat ramp?" In response to this subsequent inquiry, the user can then reply by sending a number, for example, of between 1 and 90 in order to indicate an estimate of the number of minutes that user has been currently located at the boat ramp or some other appropriate response to the subsequent inquiry.

It is to be appreciated that even if the user does not reply to the initial "push" notification 24 or the follow-up inquiry or notification 26 concerning how busy the boat ramp is, the system can still learn from this unanswered initial "push" notification 24 and estimate—based upon how long the smart phone 12 of that user remains located at the boat ramp—how busy that boat ramp currently is. For example, if the location information of the smart phone 12 of that user subsequently shows that the smart phone 12 of that user is no longer located at the boat ramp but is now currently located in a boat out on the water 15 minutes after the user received the initial "push" notification 24 from the boat ramp occupancy indicator system and associated method 2, then the system can extrapolate and conclude that the "FTL Club Boat & Trailer" ramp is "not very busy" since 15 minutes, for example, is a relatively short duration of time to unload a boat and thereafter commence a boating activity.

Further, if the location information of the smart phone 12 of that user subsequently shows that the smart phone 12 of that user is no longer located at the boat ramp but is traveling away from the boat ramp, 10 minutes after the user received the initial "push" notification 24 from the boat ramp occupancy indicator system and associated method 2, then the system can extrapolate and conclude that the "FTL Club Boat & Trailer" ramp is "very busy" since the user does not want to wait in line to launch the boat. In addition, if the location information of the smart phone 12 of that user shows that the user still appears to be waiting in line, for example, 90 minutes after the time that the user first received the initial "push" notification 24 inquiring if the user was at the "FTL Club Boat & Trailer" ramp?", then the system can extrapolate and conclude that the "FTL Club Boat & Trailer" ramp is quite busy since 90 minutes is a relatively long duration of time to unload a boat at that boat ramp. The system can learn from the collected data and make informed determinations concerning the occupancy level at each one of the boat ramps depending upon how long it takes the phone of the user to be moved to a different location remote from the boat ramp.

The boat ramp occupancy indicator system and associated method 2 can, based upon the associated parameters of each boat ramp, e.g., the layout of the boat ramp, the degree of difficulty in unloading or loading a boat, the distance between the boat ramp and the parking area, etc., then determine an "average" time to load/unload a boat at each boat ramp when the boat ramp is at a medium occupancy level, for example. This average time to load/unload a boat data can then be utilized and compared to the length of time that the smart phone of any particular user is located at any particular boat ramp. For example, if the length of time that the smart phone of any user is at the boat ramp is less than the "average" time it normally takes to load/unload a boat, then this generally signifies to the boat ramp occupancy indicator system and associated method 2 that the boat ramp is not very busy. On the other hand, if the length of time that the smart phone of any user is at the boat ramp is approximately equal to the average time it takes to load/unload a boat, then this signifies that the boat ramp is moderately busy. Alternatively, if the length of time that the smart phone of any user is at the boat ramp is greater than the average time to load/unload a boat, then this signifies that the boat ramp is quite busy.

As a further feature, the boat ramp occupancy indicator system and associated method 2 can initiate a "group chat" (not shown in detail) that could include all of the users of the boat ramp occupancy indicator system and associated method 2 who are currently located at the same boat ramp, e.g., a first group chat for all of the users currently at the "FTL Club Boat & Trailer" ramp, another group chat for all of the users currently at the "Yacht Club Deerfield (Lincoln Rd), FL" ramp, etc. Such group chats permit the users to comment on and share their thoughts relating to their current experience at one of the boat ramps. In addition, the boat ramp occupancy indicator system and associated method 2 could also permit other users, currently contemplating on accessing that same boat ramp, e.g., the "FTL Club Boat & Trailer" ramp, the "Yacht Club Deerfield (Lincoln Rd), FL" ramp, etc., to join in one or more of those group chats and directly inquire whether or not it makes sense for such potential user(s) to utilize that boat ramp in order to launch his/her boat in the near future or seek an alternative boat ramp.

The end-user application 14, operating on the smart phone 12 of a user, is typically provided with a search field 32, see FIG. 3A, which permits a user to search for a desired boat ramp for unloading and/or loading a boat in to or out of a desired body of water. The end-user application 14 provides the user with an option of saving, e.g., an "Add a new favorite boat ramp" button 34, which, once depressed, adds the searched boat ramp as a "favorite" boat ramp of that user (see FIGS. 3A and 3E). Once a "favorite" boat ramp is selected by the user and saved, the end-user application 14 can then display each of the one or more saved "favorite" boat ramps of the user as an individual "tile" 36 for quick and efficient viewing by the user, as generally shown in FIGS. 3A and 3E.

Alternatively, both a search field 32 and a map 66, depicting the local area where the smart phone 12 is located, may be displayed by the end-user application 14 with all of the available boat ramps being designated by a separate dropped "pin", only one dropped pin 68 is shown in FIG. 3J. When the user "hovers over" one of the dropped pins 68 designating a boat ramp, further details concerning that boat ramp are displayed, e.g., the overall satisfaction rating(s) 42 of other users concerning that particular boat ramp, the overall perception rating(s) of other users concerning the cleanliness of the boat ramp 44 and the overall perception rating(s) of other users relating to the ease or difficulty 46 of unloading and loading a boat at that particular boat ramp are displayed, as generally shown in FIG. 3K. In the event that the user selects one of the dropped pins 68 designating a boat ramp, then the end-user application 14 displays another screen, as shown in FIG. 3L, which provides additional details concerning the boat ramp and provides an "Add to your list" button 34 to save this boat ramp as a favorite.

After one or more boat ramp(s) is/are selected by a user, the end-user application 14 can then display useful information concerning each one of the selected boat ramps on a displayed page of the end-user application 14, see FIGS. 3B and 3F. For example, as shown in see FIG. 3A, the end-user application 14 can readily provide current information relating to the current occupancy level, for example, of three selected and stored boat ramps, e.g., Yacht Club Deerfield, FL is "Busier than usual!", Miami Lakes Part, FL is "Not too busy!" and Miami River Ramp, FL is "Less busy than usual!" In addition, the associated tile 36 can also display current weather and tidal information relating to the stored boat ramp.

The end-user application 14, once a desired boat ramp is selected by a user (see FIGS. 3B and 3E), then displays additional useful information concerning the selected boat ramp, e.g., Yacht Club Deerfield (Lincoln Rd), FL. This useful information may include, for example, either an overhead picture of the boat ramp, e.g., a picture 38 sent by a boat owner or captain currently at the boat ramp, a satellite picture of the boat ramp showing the available parking, etc. In addition, the end-user application 14 may be provided with a "Traffic" or "Navigate here" button 40 which, once selected by the user, will obtain driving directions for the user indicating the preferred travel route from the user's current location to the designated boat ramp. Further, the end-user application 14 may provide information concerning the overall satisfaction ratings 42 of other users concerning a particular boat ramp, the overall perception rating of other users concerning the cleanliness of the boat ramp 44 and the overall perception rating of other users relating to the ease or difficulty 46 of unloading and loading a boat at that particular boat ramp, etc.

The end-user application 14 may also display information, on an hour by hour basis for example, concerning the occupancy level 48 of the boat ramp over the past 12 hours, for example, with an indication of the current occupancy level of the boat ramp being emphasized or highlighted in some fashion. One modification includes adding a "calendar" button 50 so that, when the user clicks the calendar button 50, the user is able to look into the future in order to obtain an indication of the estimated occupancy level of that boat ramp at some point in time in the foreseeable future. In addition, when a user selects the "Get notified when low occupancy" button 52, the end-user application 14 provides the user with a notification, from the boat ramp occupancy indicator system and associated method 2, when the occupancy, for that selected boat ramp, is at or below a desired occupancy threshold. Alternatively, when a user selects the "Set a time you wish to be there" button 54, the end-user application 14 provides the user with an option to receive a notification, from the boat ramp occupancy indicator system and associated method 2, indicating when the user should leave his/her currently location so as to arrive at the designated boat ramp. Upon selection of the "Set a time you wish to be there" button 54, the end-user application 14 will then determine, in view of the current traffic conditions at and adjacent the boat ramp, at and adjacent the user's current location as well as the current traffic conditions located between those two locations, the anticipated travel time that it will take the user to travel and tow his/her boat from the current location to the selected boat ramp and provide a suitable notification to the user of a suggested departure time, to leave his/her current location, so as to arrive at the boat ramp at the designated arrival time to use the boat ramp.

On another page of the end-user application 14 operating on a smart phone 12 the user, as shown in FIG. 3C, the current weather information 56, e.g., the current temperature, the current wind speed and the current wind direction, etc., may also be provided. The end-user application 14 also provides current tidal information 58, e.g., an indication of whether it is high tide or low tide, whether the tide is rising or falling, the specific time of high tide and low tide for the next 12 hours on that day, the height of the tide, etc. The end-user application 14 may also display a graphic depiction the high and the low tides for that day and thereby provide the user with a quick reference concerning the tidal information for that day at the selected boat ramp. It is to be appreciated that both the weather information 56 and the tidal information 58 are generally received by the boat ramp occupancy indicator and method 2 and transmitted to the end-user application 14, or directly by the end-user application 14, from the weather station or the service provider located closest to each one of the boat ramps so as to provide the user with the most accurate and up to date information concerning the current weather and tidal information 56, 58.

On yet another page of the end-user application 14, as shown in FIG. 3D, relevant information 60 relating to the properties of the boat ramp may be displayed. For example, the end-user application 14 may provide information concerning the slope or inclination angle of the boat ramp, information concerning the type of surface of the boat ramp, e.g., concrete, pavement, gravel, etc., and/or information concerning the draft of the boat ramp, etc.

The boat ramp occupancy indicator and method 2 and/or the end-user application 14 can also provide information relating to the services 62 that are currently available at or near the selected boat ramp. For example, the end-user application 14 may indicate whether or not free or paid parking is available at or near by the boat ramp, whether or not the boat ramp includes a dock, whether or not a marina is associated with the boat ramp, whether or not any food or restaurant is/are available at or near by the boat ramp, whether or not any fuel is available at or near by the boat ramp, and/or whether or not any restroom facilities are available at the boat ramp.

Lastly, the end-user application 14 can provide a "Reviews" button 64 which, when actuated by the user, permits the user to post his/her review relating to a recent experience with the boat ramp and/or to access recently posted reviews of other users concerning their experience with that boat ramp. FIGS. 3D and 3G show screen shots of the in which zero Reviews were posted for a particular boat ramp, while FIG. 3H show a screen shots in which 12 Reviews were posted for a particular boat ramp. When the user of the end-user application 14 selects the "Reviews" button 64, then the end-user application 14 will display the various reviews 66 in chronological order, for example (see FIG. 3I).

Figure 5A:
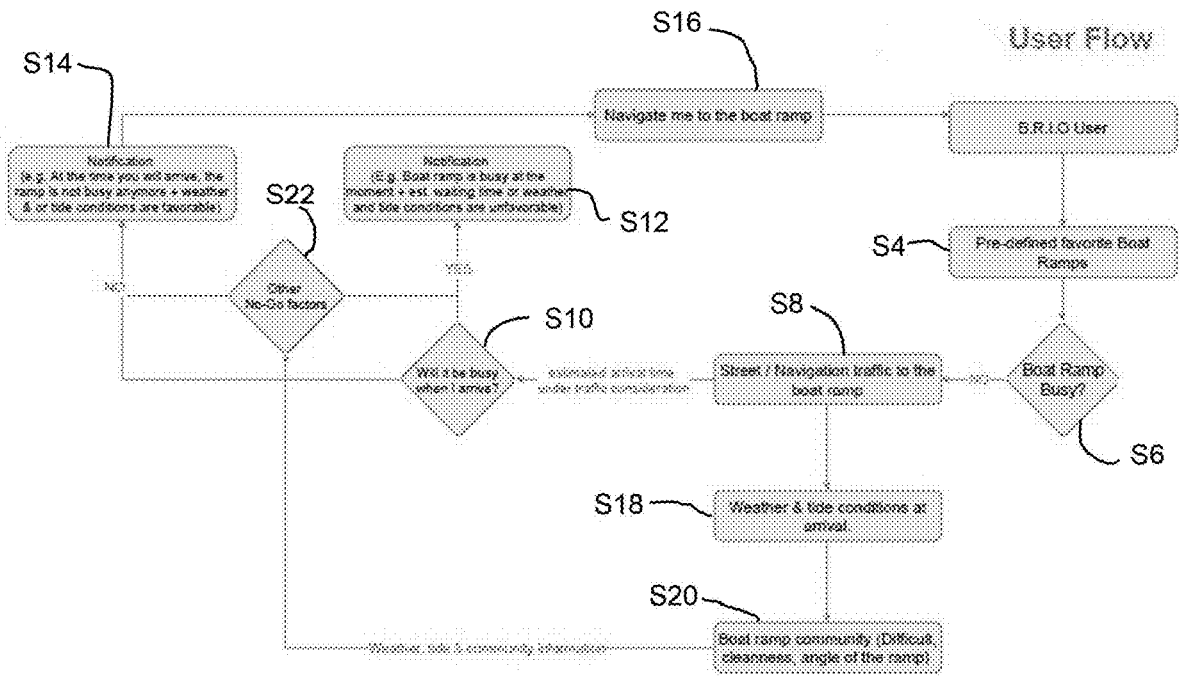
FIG. 5A is a diagrammatic view showing the flow process of the boat ramp occupancy indicator system and method, according to the disclosure, when a favorite boat ramp is indicated as not being busy.
Figure 5B:
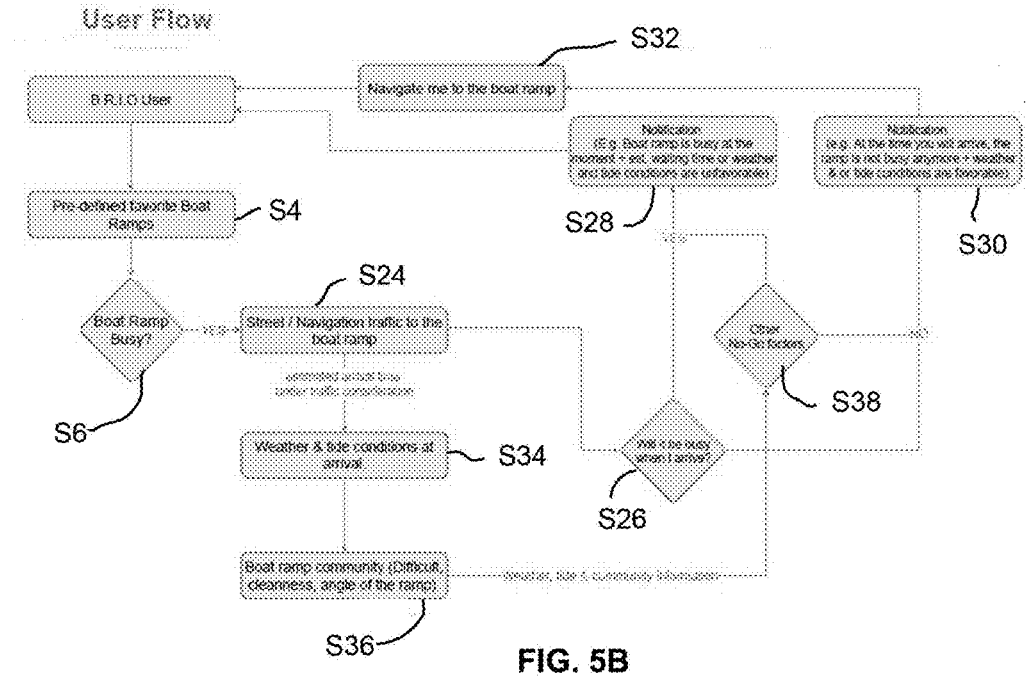
FIG. 5B is a diagrammatic view showing the flow process of the boat ramp occupancy indicator system and method, according to the disclosure, when a favorite boat ramp is indicated as being busy.

With reference now to FIGS. 5A and 5B, flow diagrams, relating to operation of the boat ramp occupancy indicator and method 2, will now be discussed.

As shown in FIG. 5A, at step S4, the boat ramp occupancy indicator and method 2 permits the user to select a desired boat ramp to be utilized for loading/unloading a boat. The boat ramp occupancy indicator and method 2, at step S6, then asks the question of whether or not the selected boat ramp is busy? In the event that the boat ramp occupancy indicator and method 2 then determines that the selected boat ramp is not currently busy, i.e., "no", then the boat ramp occupancy indicator and method 2 checks, at step S8, the current street/navigation traffic situation between the user's present location and the selected boat ramp to determine the estimated travel time for the user in traveling from the user's present location to the selected boat ramp. The boat ramp occupancy indicator and method 2 then renders an assessment, at step S10, based upon the estimated travel time for the user, in traveling from the user's present location to the selected boat ramp, and the current occupancy level for the selected boat ramp, whether or not the selected boat ramp will be busy at the estimated time that the user will arrive at the selected boat ramp.

If the answer to that question, at step S10, is "YES," then the boat ramp occupancy indicator and method 2 generates a notification, at step S12, which is sent to the smart phone of the user indicating that the boat ramp is busy at the moment. The notification may also include an estimated wait time at the selected boat ramp or possibly an indication of the weather and/or tidal information, e.g., the weather and/or tidal are currently unfavorable. Alternatively, if the answer to the question, at step S10, is "NO," then the boat ramp occupancy indicator and method 2 generates a notification, at step S14, which is sent to the smart phone of the user indicating that at the time that the user is estimated to arrive at the selected boat ramp, the selected boat ramp will be sufficiently accessible and the weather and/or tidal information should be favorable. In addition, the boat ramp occupancy indicator and method 2 will then generate, at step S16, navigational directions for efficient travel from the user's present location to the selected boat ramp.

As shown at step S18 in FIG. 5A, the boat ramp occupancy indicator and method 2 also collects and evaluates whether or not the current weather and tidal conditions will be acceptable once the user eventually arrives at the selected boat ramp. At step S20, the boat ramp community satisfaction rating(s) for the selected boat ramp, the overall perception rating(s) of other users concerning the cleanliness of the selected boat ramp and the overall perception rating(s) of other users relating to the ease or difficulty of unloading and loading a boat at that selected boat ramp are evaluated. Based upon these additional factors, generated at steps S18 and S20, the boat ramp occupancy indicator and method 2 then evaluates, at step S22, whether or not any other "no-go" factors would influence which particular notification, e.g., generated at step S12 or S14, should be sent to the user by the boat ramp occupancy indicator and method 2. These other "no-go" factors can either reinforce, modify or alter the determination made by the boat ramp occupancy indicator and method 2 of which notification, at steps S12 or S14, should be sent to the smart phone of the user.

Referring now to FIG. 5B, at step S4, again the boat ramp occupancy indicator and method 2 permits the user to select a desired boat ramp to be utilized for loading/unloading a boat. The boat ramp occupancy indicator and method 2, at step S6, then asks the question of whether or not the selected boat ramp is busy? In the event that the boat ramp occupancy indicator and method 2 then determines that "YES" the selected boat ramp is currently busy, then the boat ramp occupancy indicator and method 2 checks, at step S24, the current traffic situation between the user's present location and the selected boat ramp to determine the estimated travel time for the user in traveling from the user's present location to the selected boat ramp. The boat ramp occupancy indicator and method 2 then renders an assessment, at step 26, based upon the estimated travel time for the user, in traveling from the user's present location to the selected boat ramp, and the current occupancy level for the selected boat ramp, whether or not the selected boat ramp will be busy at the estimated time that the user will arrive at the selected boat ramp.

If the answer to that question, at step S26 is "YES," then the boat ramp occupancy indicator and method 2 generates a notification, at step S28, which is sent to the smart phone of the user that the boat ramp is busy at the moment. The notification may also include an estimated wait time or possibly an indication of the weather and/or tidal information, e.g., the weather and/or tidal are currently unfavorable. Alternatively, if the answer to the question at step S26 is "NO," then the boat ramp occupancy indicator and method 2 generates a notification, at step S30, which is sent to the smart phone of the user that at the time that the user is estimated to arrive at the selected boat ramp, the selected boat ramp will be sufficiently accessible and the weather and/or tidal information should still be favorable. In addition, the boat ramp occupancy indicator and method 2 will then generate, at step S32, navigational directions for efficient travel from the user's present location to the selected boat ramp.

As shown in FIG. 5B, at step S34, the boat ramp occupancy indicator and method 2 also collects and evaluates whether or not the current weather and tidal conditions will be acceptable once the user eventually arrives at the selected boat ramp. At step S36, the boat ramp community satisfaction rating(s) for the selected boat ramp, the overall perception rating(s) of other users concerning the cleanliness of the selected boat ramp and the overall perception rating(s) of other users relating to the ease or difficulty of unloading and loading a boat at that selected boat ramp are evaluated. Based upon these additional factors, generated at steps S34 and S36, the boat ramp occupancy indicator and method 2 then evaluates, at step S38, whether or not any other "no-go" factors would influence which particular notification, e.g., steps S28 or S30, should be sent to the smart phone of the user by the boat ramp occupancy indicator and method 2. These other "no-go" factors can either reinforce, modify or alter the determination made by the boat ramp occupancy indicator and method 2 of which notification, at steps S28 or S30, should be sent to the smart phone of the user.

The boat ramp occupancy indicator and method 2 and/or the end-user application 14 are specifically designed to provide a boat owner or captain answers the following questions:

Is one of my favorite boat ramps busy at the moment?
1. NO: the end-user application 14 provides the user with a notification about a "not as crowded as usual" boat ramp.
2. NO: If I start now, will I arrive at the boat ramp at a time when the desired boat ramp is busy, considering my current travel time and local street traffic?
3. YES: What is the ramp occupancy currently, and at what time will the occupancy level be better (e.g., lower occupancy)?
4. YES: What is the current estimated waiting time at the boat ramp?
5. YES: If I leave now from my current location, will I arrive at the boat ramp at a time when it is not as busy as usual, considering my current travel time and local street traffic?

Are the weather and the tide both currently good for unloading or loading a boat at one of my favorite boat ramps?
1. YES: The boat ramp is empty, the weather conditions are good and the tidal conditions are good.
2. YES: But the ramp is crowded and so the boat owner or captain must consider or check to see if, at the estimated time of arrival at the boat ramp, whether the occupancy level conditions could change.
3. YES: What are the current tidal conditions and should the boat owner or captain expect any significant changes in any of the tidal conditions?
4. NO: Is there maybe another one of my favorite boat ramps which has better weather conditions and/or tidal conditions at the moment?
5. NO: Tide conditions are low and there may be higher risk to cause damage to my boat, trailer or tow vehicle?

What is the current condition of the boat ramp facility?
1. Good: other users rated the cleanliness or the difficulty of the ramp (etc., a huge inclination angle of the ramp that is not easy for beginners)
2. Bad: Maybe I should go to another ramp!

An important feature of the boat ramp occupancy indicator and method 2 and/or the end-user application 14 is that every user of the system, whether a user of the end-user application 14, integrated into a third party application, or integrated into a cloud application, is able to provide real time feedback, information and data about the current occupancy level and conditions of desired boat ramps.

As discussed above, the prediction quality depends on the amount of data inputted from the various users of the boat ramp occupancy indicator and method 2 and/or the end-user application 14. The accuracy will substantially increase once the boat ramp occupancy indicator and method 2 and/or the end-user application 14 reaches a statistically significant conclusion/good enough quality. The self-learning aspect of the algorithm will automatically increase the prediction quality over time as the amount of data increases.

While the boat ramp occupancy indicator and method 2 and the end-user application 14 are described above, it is to be appreciated that the principles of this disclosure are directly applicable and can be utilized for other applications. In view of this, the term "vehicle," as employed within this disclosure and the accompanying claims, is intended to mean and be construed to include any type of boat, vessel, etc., which may be loaded on an associated trailer and transported from one location to another location.

Inasmuch as the invention is subject to variations and improvements, it is intended that the foregoing shall be interpreted as merely illustrative of presently preferred embodiments of the invention defined by the following claims.

It is to be understood that the present invention can be implemented in various forms of hardware, software, firmware, special purpose processes, or a combination thereof. In one embodiment, the present invention can be implemented in software as an application program which is tangibly embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

We claim:

1. A system having a server comprising:

a processing unit configured to receive at a first input information relating to at least one of current weather and tidal information in a vicinity of a plurality of boat ramps, and to receive at a second input information relating to traffic in a vicinity of the plurality of boat ramps; and a database for storing information received by the processing unit, the processing unit further configured to:

receive location data from a plurality of smart phones each having a boat ramp occupancy end-user application operating thereon, send a push notification when any one of the plurality of smart phones is located at or near a selected boat ramp, the push notification inquiring of a user of the one of the plurality of smart phones whether the user is located at or near the selected boat ramp, determine, based upon the location data and how long the location data indicates presence at a location, regardless of whether or not the user responds to the push notification, how busy the selected boat ramp is, and send notifications about conditions at the selected boat ramp, including information about traffic, weather and/or tidal information, and how busy the selected boat ramp is determined to be, to other users of the boat ramp occupancy end-user application who have designated the selected boat ramp as a favorite boat ramp.

2. The boat ramp occupancy indicator system according to claim 1, wherein the system determines how busy the selected boat ramp is based upon a received reply to the push notification.

3. The boat ramp occupancy indicator system according to claim 1, wherein the system determines how busy the selected boat ramp is based upon how long the smart phone of the user is located at the selected boat ramp.

4. The boat ramp occupancy indicator system according to claim 1, wherein the system determines how busy the selected boat ramp is based upon how long it takes the smart phone of the user to move to a location remote from the selected boat ramp.

5. The boat ramp occupancy indicator system according to claim 4, wherein the server is a multi-data source which is designed for aggregation and compilation of data, has a machine learning and pattern analysis functionality, is designed to provide statistical data and probability calculations, and generates decision and risk calculations.

6. The boat ramp occupancy indicator system according to claim 1, wherein the processing unit is further configured to initiate a "group chat" for each user operating the end-user application on his/her smart phone and located at the selected boat ramp.

7. The boat ramp occupancy indicator system according to claim 6, wherein the processing unit is further configured to permit other users operating the boat ramp occupancy end-user application, to join in the group chat.

8. The boat ramp occupancy indicator system according to claim 1, wherein each smart phone has a camera for inputting one or more images of the selected boat ramp and the processing unit is further configured to receive the one or more images for evaluating how busy the selected boat ramp is based upon the received images.

9. A method, comprising:

receiving information relating to at least one of current weather and tidal information in a vicinity of a plurality of boat ramps;

receiving information relating to traffic in a vicinity of the plurality of boat ramps;

receiving location data from a plurality of smart phones each having a boat ramp occupancy end-user application operating thereon;

determining when any one of the plurality of smart phones is located at or near a selected boat ramp;

sending a push notification, based upon the determination that one of the plurality of smart phones is located at or near a selected boat ramp, the push notification inquiring of a user of the one of the plurality of smart phones whether the user is located at or near the selected boat ramp;

determining how busy the selected boat ramp is based upon the location data and how long the location data indicates presence at a location; and sending notifications about conditions at the selected boat ramp, including information about traffic, weather and/or tidal information, and how busy the selected boat ramp is determined to be, to other users of the boat ramp occupancy end-user application who have designated the selected boat ramp as a favorite boat ramp.

10. The method of claim 9, wherein determining how busy the selected boat ramp is, is based upon a received reply to the push notification.

11. The method of claim 9, wherein determining how busy the selected boat ramp is, is based upon how long the smart phone of the user is located at the selected boat ramp.

12. The method of claim 9, wherein determining how busy the selected boat ramp is, is based upon how long it takes the smart phone of the user to move to a location remote from the selected boat ramp.

13. The method of claim 12, wherein the method is performed by a multi-data source designed for aggregation and compilation of data, having a machine learning and pattern analysis functionality, designed to provide statistical data and probability calculations, and that generates decision and risk calculations.

14. The method of claim 9, further comprising initiating a "group chat" for each user operating the end-user application on his/her smart phone and located at the selected boat ramp.

15. The method of claim 14, further comprising permitting other users operating the boat ramp occupancy end-user application to join in the group chat.

16. The method of claim 9, further comprising receiving one or more images for evaluating how busy the selected boat ramp is based upon the received images.

\* \* \* \* \*